United States Patent
Hall et al.

(10) Patent No.: US 10,688,826 B2
(45) Date of Patent: Jun. 23, 2020

(54) ADJUSTABLE CASTER ASSEMBLY

(71) Applicant: DoRodo, LLC, Wayland, MI (US)

(72) Inventors: Joel Hall, Wayland, MI (US); Jason Popma, Wayland, MI (US); Jaekil Chung, Dangjin-si (KR)

(73) Assignee: DoRodo, LLC, Wayland, MI (US)

( * ) Notice: Subject to any disclaimer, the term of this patent is extended or adjusted under 35 U.S.C. 154(b) by 0 days.

(21) Appl. No.: 16/015,706

(22) Filed: Jun. 22, 2018

(65) Prior Publication Data

US 2018/0370281 A1     Dec. 27, 2018

Related U.S. Application Data

(60) Provisional application No. 62/523,392, filed on Jun. 22, 2017.

(51) Int. Cl.
*B60B 33/06* (2006.01)
*B60B 33/00* (2006.01)

(52) U.S. Cl.
CPC ........ *B60B 33/063* (2013.01); *B60B 33/0068* (2013.01); *B60B 33/0089* (2013.01); *B60B 2900/131* (2013.01)

(58) Field of Classification Search
CPC . Y10T 16/182; Y10T 16/193; Y10T 16/1937; Y10T 16/3834; B60B 33/04; B60B 33/06; B60B 33/063; B60B 33/0068; B60B 33/0089; B60B 2900/131
See application file for complete search history.

(56) References Cited

U.S. PATENT DOCUMENTS

| | | | | |
|---|---|---|---|---|
| 2,697,243 A | * | 12/1954 | Shager | D05B 75/02 16/33 |
| 2,828,578 A | * | 4/1958 | McCabe | B60B 33/0089 16/19 |
| 3,041,083 A | * | 6/1962 | Blanc | B60B 33/06 280/43.21 |
| 3,545,707 A | * | 12/1970 | Orii | B60B 33/06 16/32 |
| 3,602,464 A | * | 8/1971 | Orii | B60B 33/04 16/32 |
| 3,653,341 A | * | 4/1972 | Nielsen | A47B 25/00 108/147 |
| 4,339,842 A | * | 7/1982 | Fontana | B60B 33/0042 16/32 |

(Continued)

FOREIGN PATENT DOCUMENTS

JP      08150804 A   *   6/1996
JP      3097724 U        2/2004
(Continued)

*Primary Examiner* — Chuck Y Mah
(74) *Attorney, Agent, or Firm* — Varnum LLP

(57) ABSTRACT

An adjustable caster assembly includes a body having a top surface and a base, and an opening within the base. A wheel is connected to the body, where the wheel is configured to extend beyond the base of the body to engage a supporting surface. A foot is positioned within the opening in the base and configured to move between an expanded position and a contracted position. The foot may be actuated by an actuation shaft that engages a gear. The actuation shaft may be movable between an engaged position and a disengaged position.

20 Claims, 8 Drawing Sheets

(56) References Cited

U.S. PATENT DOCUMENTS

| | | | | |
|---|---|---|---|---|
| 4,364,148 | A * | 12/1982 | McVicker | B60B 33/0002 16/32 |
| 4,747,180 | A * | 5/1988 | Screen | B60B 33/0042 16/33 |
| 4,918,783 | A | 4/1990 | Chu | |
| 4,991,805 | A * | 2/1991 | Solak | F16M 7/00 248/188.4 |
| 5,042,110 | A * | 8/1991 | Orii | B60B 33/0042 16/19 |
| 5,431,254 | A * | 7/1995 | Kramer | B62B 5/049 188/19 |
| 6,055,704 | A * | 5/2000 | Leibman | B60B 33/06 16/32 |
| 6,408,482 | B1 * | 6/2002 | Henriott | A47B 21/06 16/29 |
| 6,520,460 | B2 * | 2/2003 | Hallberg | F16M 11/42 16/35 R |
| 6,591,449 | B1 * | 7/2003 | Parkin | B60B 33/0028 16/19 |
| 6,637,071 | B2 * | 10/2003 | Sorensen | B60B 33/0002 16/19 |
| 7,077,369 | B2 * | 7/2006 | Hardin | F16M 11/36 16/19 |
| 7,556,227 | B2 * | 7/2009 | Thuelig | A47L 15/4253 248/125.2 |
| 8,136,201 | B2 * | 3/2012 | Yantis | A47B 91/022 16/18 R |
| 8,365,353 | B2 * | 2/2013 | Block | B60B 33/0007 16/35 R |
| 9,215,924 | B2 * | 12/2015 | Seefeldt | A47B 21/06 |
| 2003/0041409 | A1 * | 3/2003 | Caporale | B60B 33/0005 16/19 |
| 2007/0277350 | A1 * | 12/2007 | Hines | B60B 33/0007 16/35 R |
| 2012/0091299 | A1 * | 4/2012 | Levine | A47B 91/022 248/188.4 |

FOREIGN PATENT DOCUMENTS

| | | |
|---|---|---|
| KR | 10-2005-0081828 A | 8/2005 |
| KR | 10-2010-0066191 A | 6/2010 |
| KR | 10-1595841 B1 | 2/2016 |

* cited by examiner

ADJUSTABLE CASTER ASSEMBLY

CROSS-REFERENCE TO RELATED APPLICATION

This application claims priority to U.S. Provisional Patent Application No. 62/523,392 filed on Jun. 22, 2017 and entitled ADJUSTABLE CASTER ASSEMBLY, which is hereby incorporated by reference

FIELD OF INVENTION

The present invention generally relates to a caster wheel assembly, and more particularly to an adjustable caster wheel assembly for engaging and disengaging a wheel with the supporting surface and providing leveling capabilities.

BACKGROUND

Casters are widely used across a vast range of industries and on devices, equipment and materials that require movement from place to place. Casters are available in various designs, each addressing a specific purpose or need. Common examples of light-duty casters are those used on shopping carts and office chairs. Heavy-duty casters are used to move bulk materials and heavy equipment. Casters used in both light and heavy-duty applications are available as swivel casters and straight-line or rigid casters.

In some cases, casters are used on large devices or equipment that require both movement and stationary use. Some casters address this issue by including a locking wheel. However, locking wheels have several drawbacks. First, locking wheels, while locked from rotating, may still be prone to pivot or swivel about a vertical axis, potentially causing movement and vibration of the supported load. In addition, many caster wheel locks are not strong enough to prevent the wheel from rotating when a large force is applied to the supported load. Caster brakes are also easy for anyone to purposefully or accidently disengage. Further, the support on caster wheels, even when locked, is less stable than larger, flat supports that provide better contact with the ground.

For many supported loads, mobility is not the only consideration. Often times loads or equipment, such as store displays, lab equipment, vending machines, ATMs, or the like, require leveling once the machine is positioned in its desired location. For machines that do not use casters, leveling can be achieved with vertically adjustable feet. However, such adjustable feet are not attachable to casters.

Accordingly, an improved adjustable caster is needed in the industry.

SUMMARY

An adjustable caster assembly is generally presented. The adjustable caster assembly includes a body having a top surface and a base, and an opening within the base. The assembly includes a wheel connected to the body, where the wheel is configured to extend beyond the base of the body to engage a supporting surface. The adjustable caster assembly further includes a foot positioned within the opening in the base. The foot is configured to move between an expanded position and a contracted position.

In an embodiment the movement of the foot may be driven by an adjustment shaft. The adjustment shaft may drive the foot to move telescopically with respect to the base between the expanded and contracted positions. The adjustment shaft may be driven by an actuation shaft. In an embodiment, a gear may be connected to the adjustment shaft and engaged by the actuation shaft to drive the adjustment shaft.

In an embodiment, the actuation shaft may be movable between an engaged position and a disengaged position. The actuation shaft may be biased towards the disengaged position. The biasing force may be provided by a spring positioned in a housing and connected to the actuation shaft.

BRIEF DESCRIPTION OF THE DRAWINGS

The operation of the invention may be better understood by reference to the detailed description taken in connection with the following illustrations, wherein.

DETAILED DESCRIPTION

Figure 1:
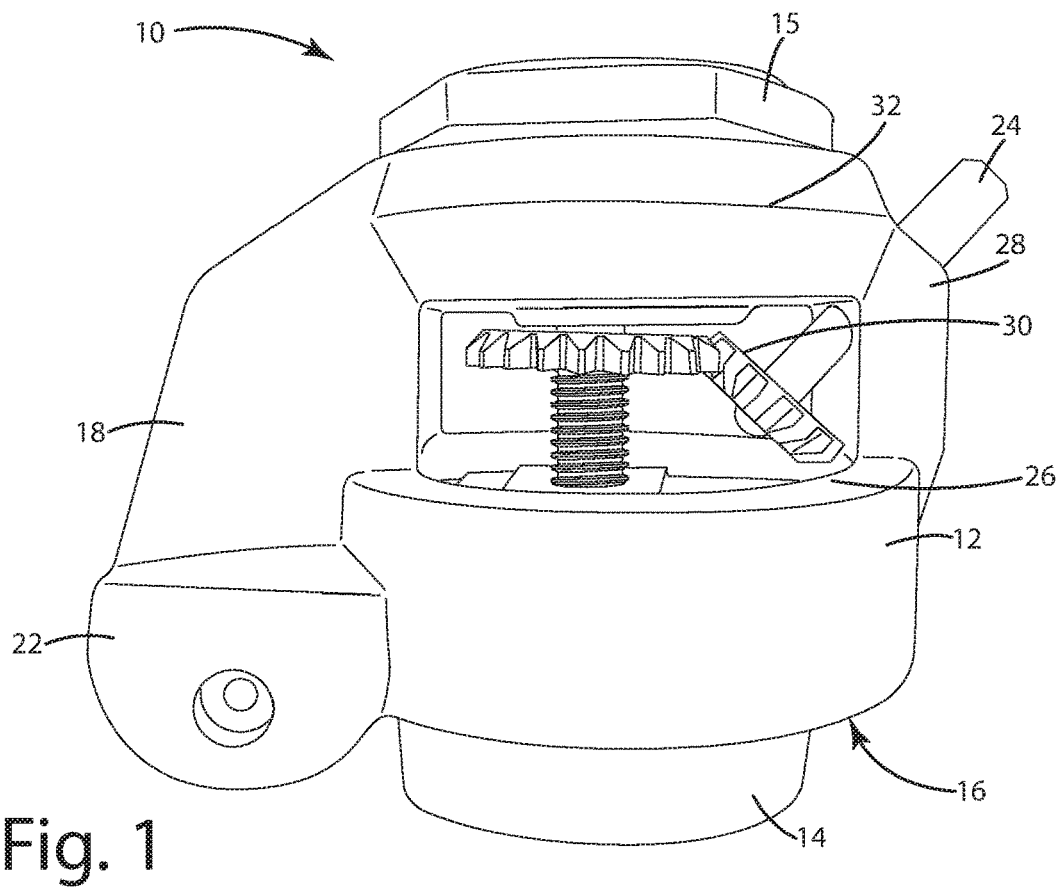
FIG. 1 illustrates a side view of a caster assembly having an angled activation shaft.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

An adjustable caster assembly 10 is generally presented. The adjustable caster assembly 10 is configured to be adjustable to move the assembly between an expanded and contracted positions, as described in further detail below. The contracted position allows contact between a wheel and a supporting surface, such as a floor, to provide mobility for the load supported by the caster assembly 10. The extended position disengages the wheel with the floor to provide stability for the supported load and leveling of the load.

The caster assembly 10 may generally comprise a body 12 and a foot 14. The body 12 may be formed of any appropriate material, such as steel, aluminum, stainless steel, nylon or any appropriate metal material. As shown in FIGS. 1-13, the body may have a generally cylindrical shape, or any appropriate shape, and may be hollow inside and open at its base. The foot 14 may be composed of any appropriate material, such as a rubber, plastic, or the like. The foot 14 may generally cylindrical or sized and shaped similar to the body 12.

The caster assembly 10 may further include a top pad 15. The top pad 15 may be positioned on a top portion of the body 12 and may be configured to support any appropriate load, such as a machine, equipment, movable device, or the like. In an embodiment, the caster assembly 10 may include a stem or bolt extending upwards from the top of the assembly. The stem or bolt may be threaded or otherwise configured to receive a load mounted thereon.

As shown in FIGS. 1-8, the foot 14 may be designed to fit into the base opening 16 of the body 12. The body 12 may include a hollow cavity 18 sized and shaped to receive at least a portion of the foot 14 therein. The foot 14 may be configured to be inserted into the cavity 18 and to move in a telescoping manner with respect to body 12. The telescoping movement between the body 12 and foot 14 may be controlled by the components of the assembly 10 as described herein. While the body 12 and foot 14 are shown and described as utilizing telescopic movement, it will be appreciated that other configurations may exists, such as a foot 14 having a cavity to receive the body 12, wherein relative movement between the body 12 and foot 14 may be facilitated. Such alternative embodiments are contemplated herein.

The body 12 may include a wheel 20 connected thereto. The wheel 20 may be connected to a wheel support 22 positioned on a rear portion of the body 12. The wheel support 22 may include an opening near the base of the body 12 to receive a wheel axle and position the wheel 20 at the base of the body 12.

The telescoping movement of the body 12 and foot 14 may be actuated by an actuation shaft 24. The actuation shaft 24 may extend away from the body 12 and actuate an internal gearing or screw when turned to drive the telescoping movement of the foot 14 with respect to the body 12. The gearing or screw may then adjust the relative distance between the body 12 and the foot 14 to raise and lower the caster assembly 10. For example, the internal gearing may include an adjustment shaft 26. The adjustment shaft 26 may be configured to adjust the vertical spacing of the foot 14 with respect to the body 12 and the wheel 20. The adjustment shaft 26 may be threaded and connected at one end in a threaded engagement to the top surface of the foot 14 and at a second end abutting an interior top surface of the body 12. In an embodiment, as shown in the rear view of FIG. 5, the caster assembly 10 may include a plate 25 positioned above foot 14. The adjustment shaft 26 may be threaded into the plate 25 to drive movement of the plate and the foot 14. Alternatively, the adjustment shaft 26 may extend through the plate 25 and be connected in threaded engagement directly with the top of the foot 14. The plate 25 may then act as a hard stop to prevent over-retraction of the foot 14 into the body 12. It will be appreciated that while not all embodiments may include a plate 25, the travel limits of the foot 14 may be set by any appropriate means, including but not limited to clutches, physical, or electronic stops.

Figure 7:
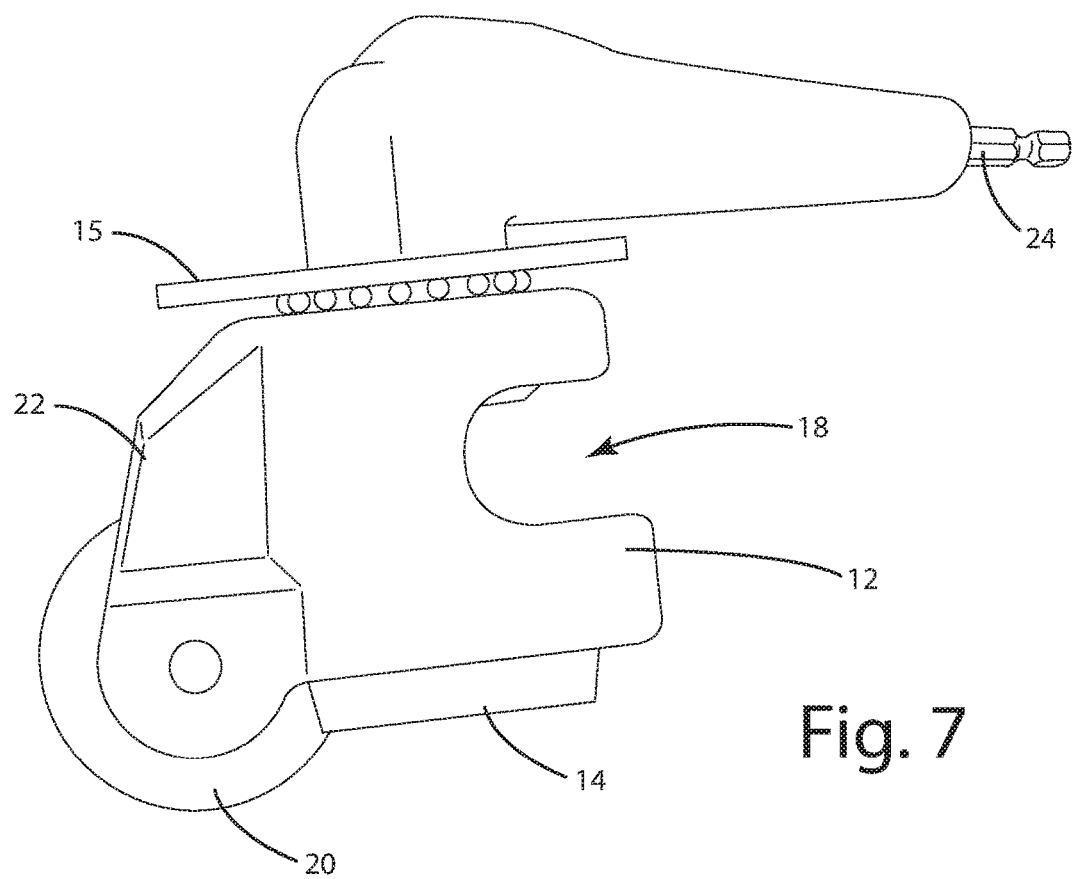
FIG. 7 illustrates a side view of a caster assembly having a 90 degree activation shaft and in retracted position.
Figure 8:
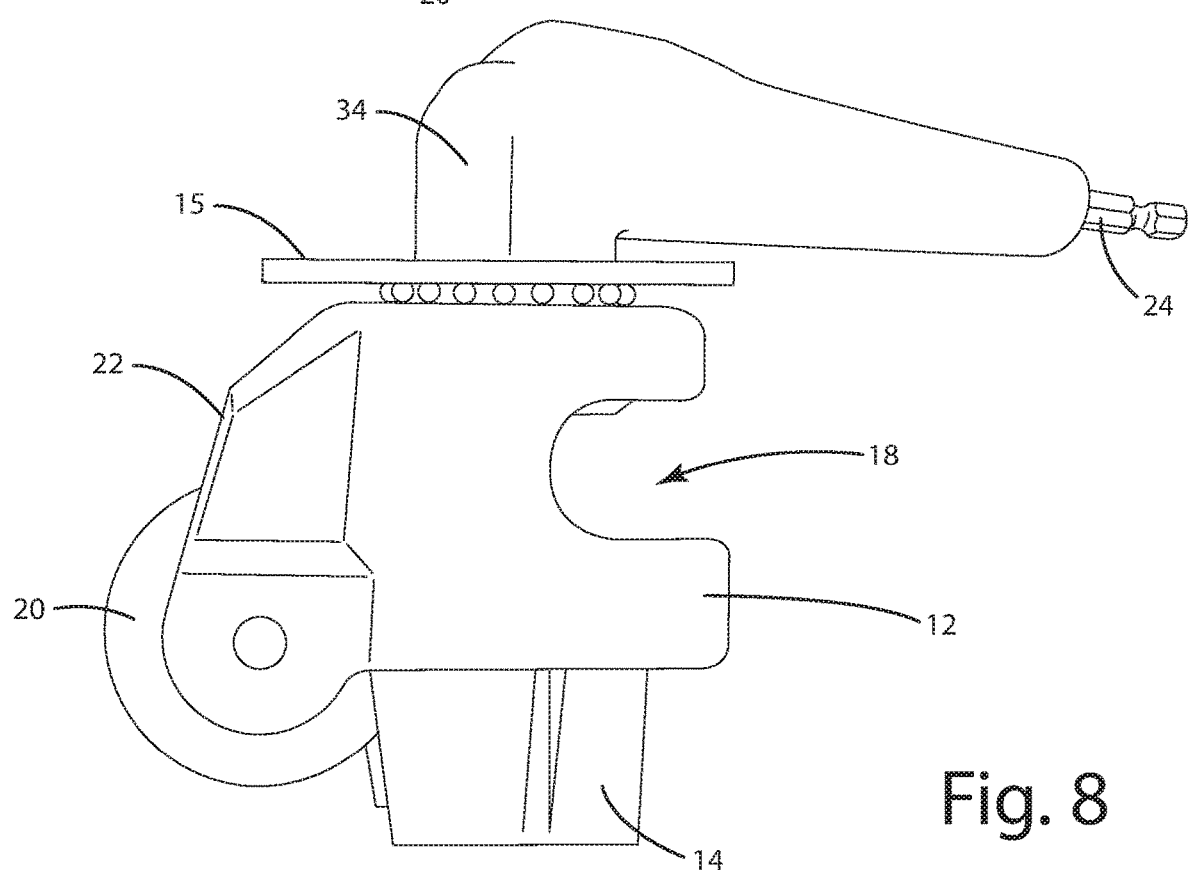
FIG. 8 illustrates a side view of a caster assembly having a 90 degree activation shaft and in extended position.
Figure 9:
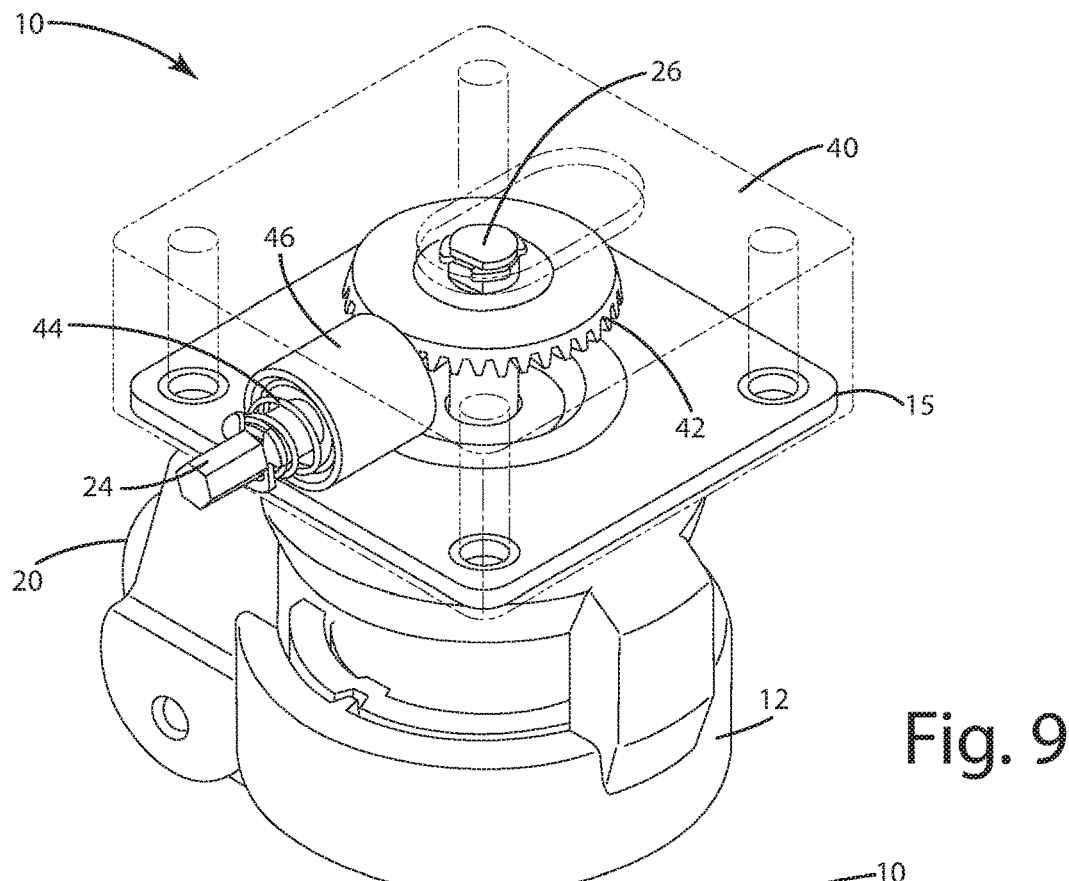
FIG. 9 illustrates a top perspective view of a caster assembly having a biased actuation shaft.
Figure 10:
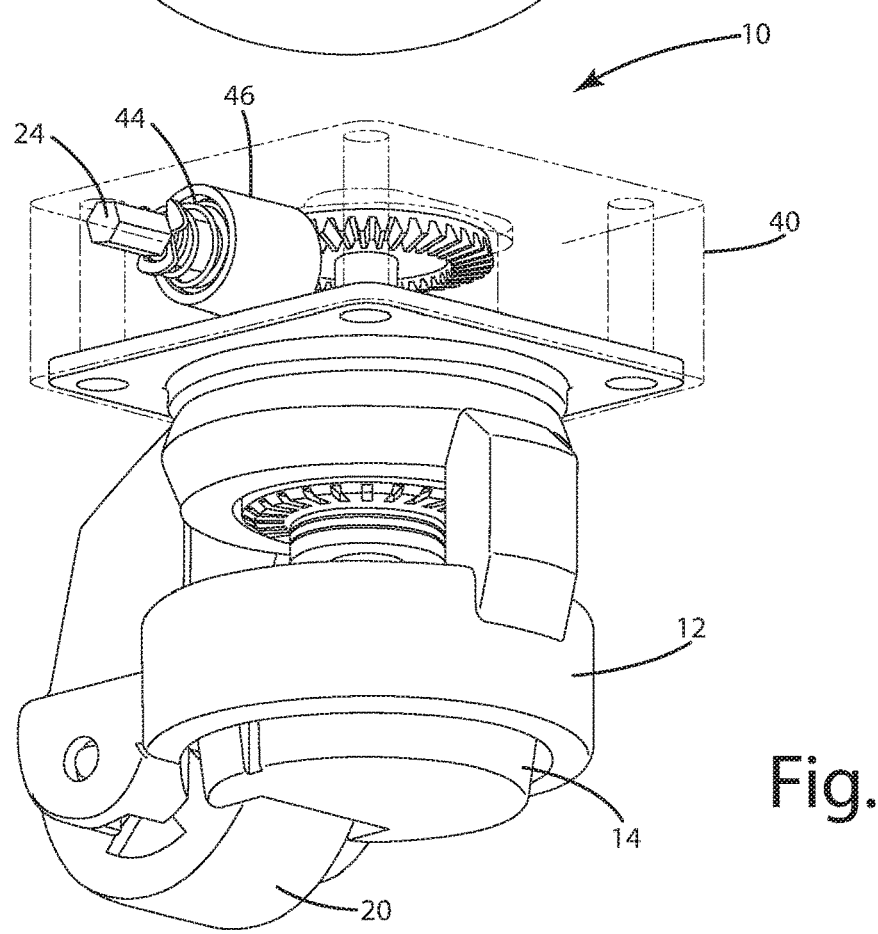
FIG. 10 illustrates a bottom perspective view of a caster assembly having a biased actuation shaft.
Figure 11:
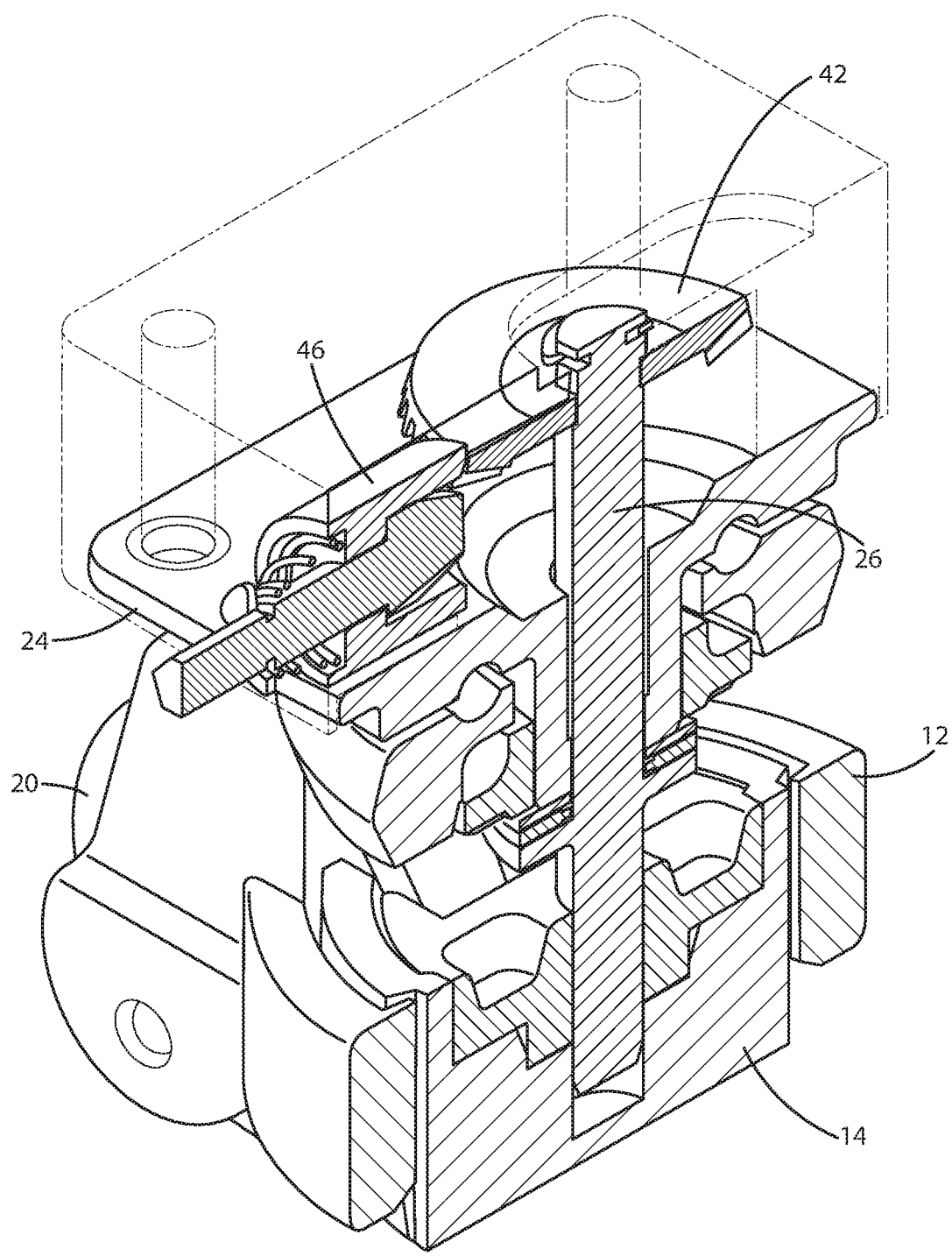
FIG. 11 illustrates a perspective cutaway view of a caster assembly having a biased actuation shaft.
Figure 12:
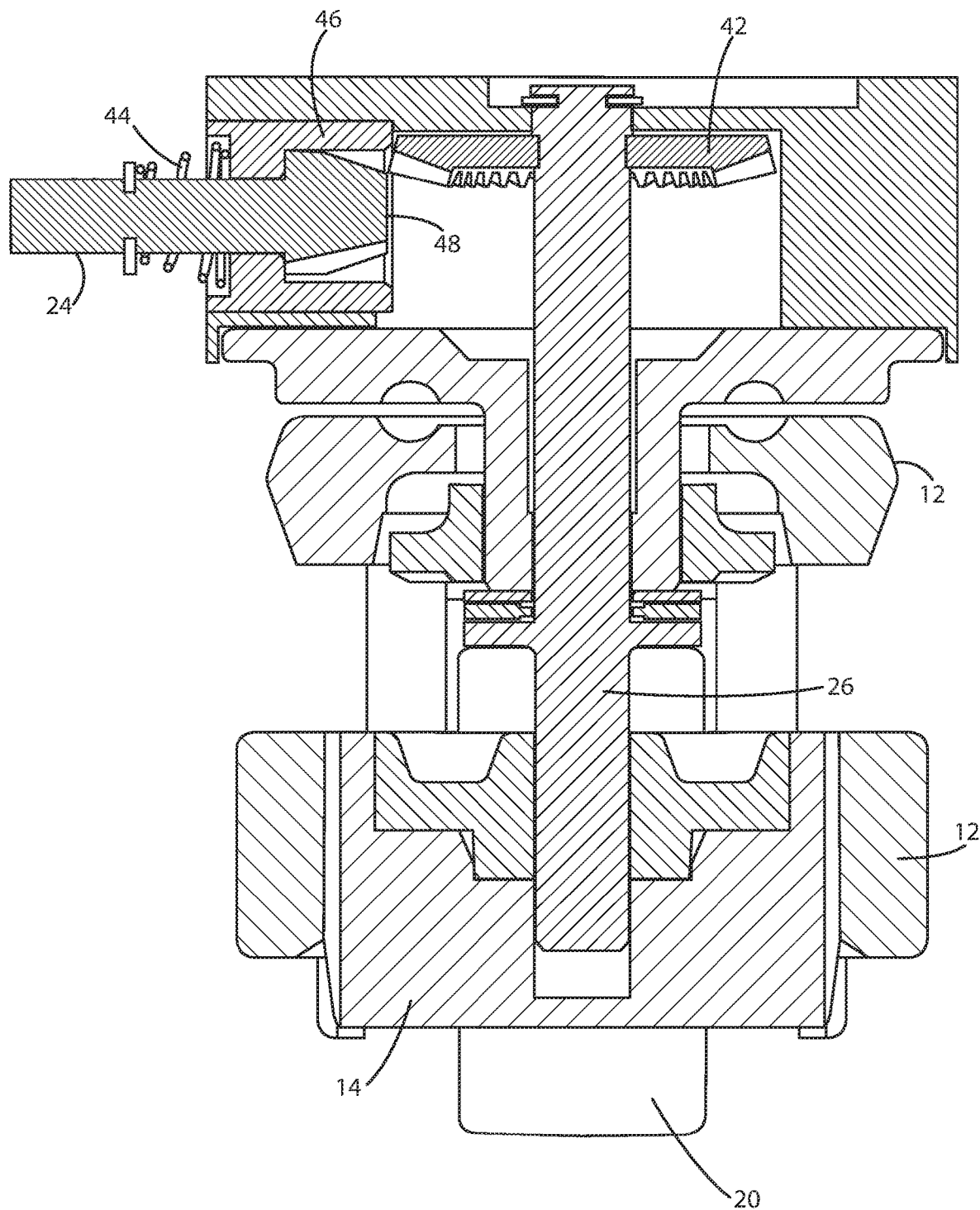
FIG. 12 illustrates a cutaway view of a caster assembly having a biased actuation shaft in the disengaged position.

As the adjustment shaft 26 is rotated in a first direction the foot 14 may be extended away from the body 12 to put the assembly 10 into extended position, such as shown in FIG. 8. As the adjustment shaft 26 is rotated in a second direction, the foot 14 may be retract toward the body 12 into the cavity 18 to put the assembly 10 into retracted position, such as shown in FIG. 7. In extended position, the foot 14 may extend beyond the wheel 20 such that the supported load is supported on the foot 14 and the wheel 20 is lifted off of the supporting surface, thus providing a more stationary base for the assembly 10. In contracted position the foot 14 may be retracted back toward the body and above the wheel 20 such that the wheel remains in contact with the supporting surface and the foot 20 is not in contact with the supporting surface.

Figure 2:
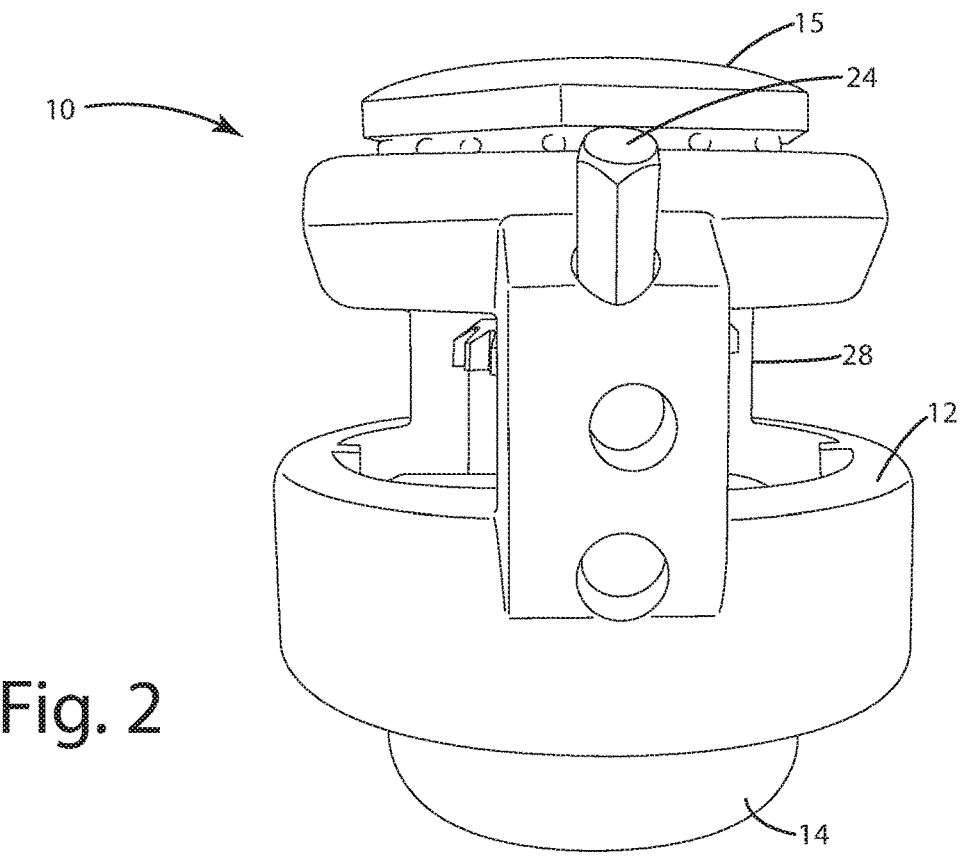
FIG. 2 illustrates a front view of a caster assembly having an angled activation shaft.

In an embodiment illustrated in FIGS. 1 and 2 the actuation shaft 24 may extend through a front portion 28 of the body 12 at an angle, such as at an approximately 45 degree angle. The front portion 28 may include one or more openings for selectively adjusting the angle of the actuation shaft 24. The actuation shaft 24 may be rotated by any appropriate means, such as by power drill, cordless drill, manual tool, motorized operation, foot pedal or any other appropriate means for adjusting or rotating the actuation shaft.

The actuation shaft 24 and adjustment shaft 26 may interact and engage to form a bevel gear connection. For example, the actuation shaft 24 may include a first gear 30 and the adjustment shaft may include a second gear 32. The first and second gears 30, 32 may be appropriately angled or beveled to form a bevel gear connection. Rotation of the actuation shaft 24 may drive rotation of the adjustment shaft 26 through the connection of the bevel gears 30, 32. It will be appreciated that the bevel gear connection may allow for orientation of the actuation shaft 24 at any appropriate angle with respect to the adjustment shaft 26. Further, various sizes and configurations of bevel gears may be used to provide the desired torque parameters.

Figure 3:
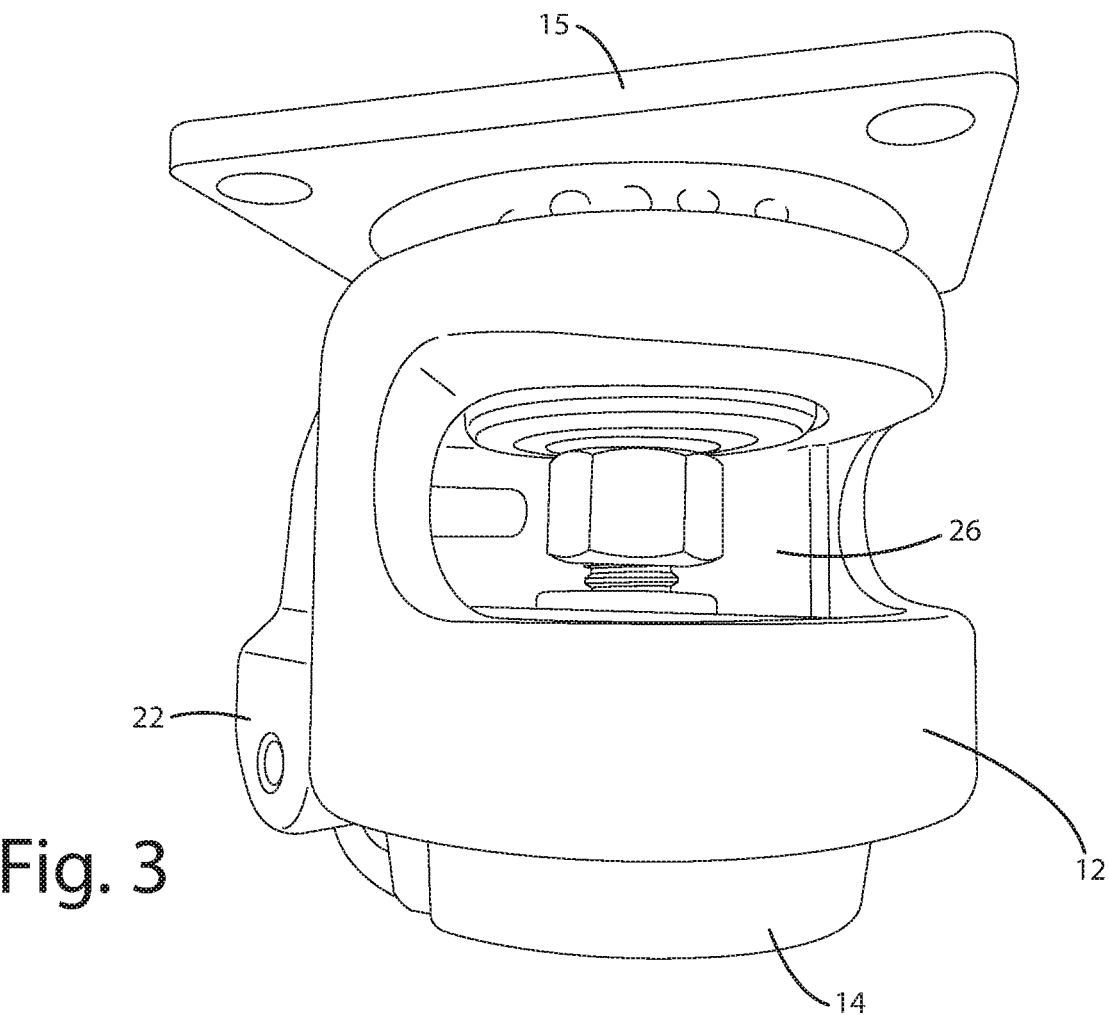
FIG. 3 illustrates a front view of a caster assembly having a vertical activation shaft.
Figure 4:
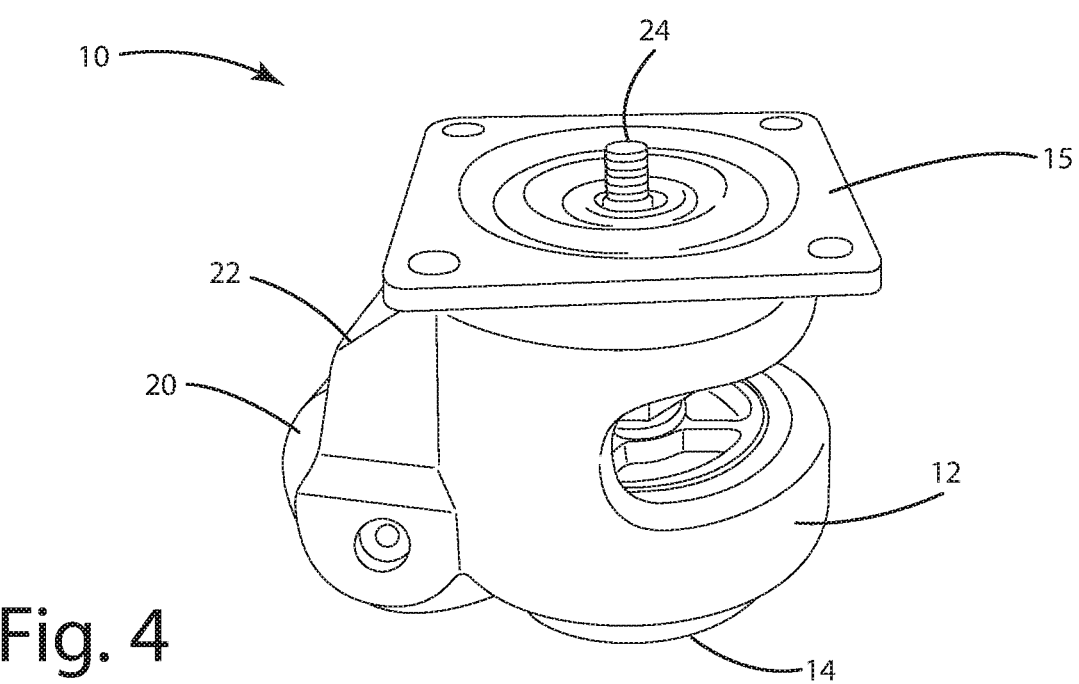
FIG. 4 illustrates a side view of a caster assembly having a vertical activation shaft.
Figure 5:
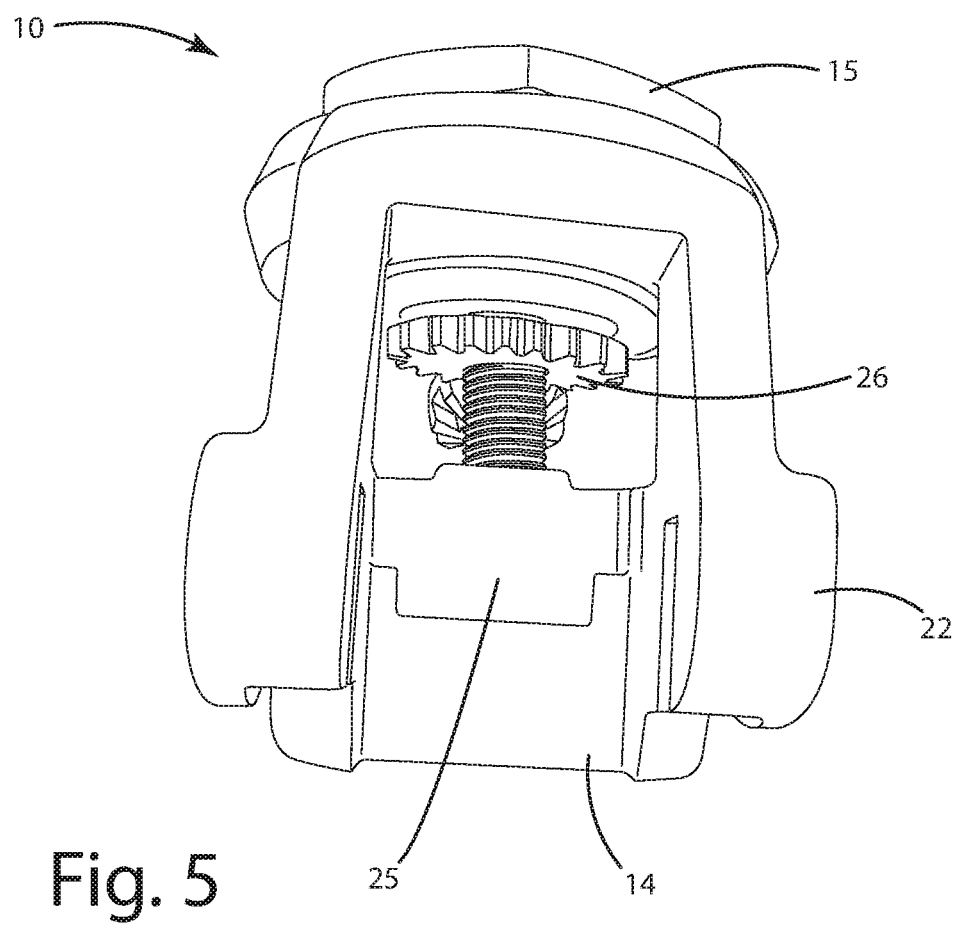
FIG. 5 illustrates a rear view of a caster assembly having a vertical activation shaft.

In an embodiment illustrated in FIGS. 3-5, the actuation shaft 24 may be oriented approximately parallel or in line with the adjustment shaft 26. For example, the actuation shaft 24 may extend vertically from the top pad 15 away from the body 12. The vertical actuation shaft 24 may be connected to the adjustment shaft 26 through any appropriate gearing, or may be directly connected to or an extension of the adjustment shaft 26.

Figure 6:
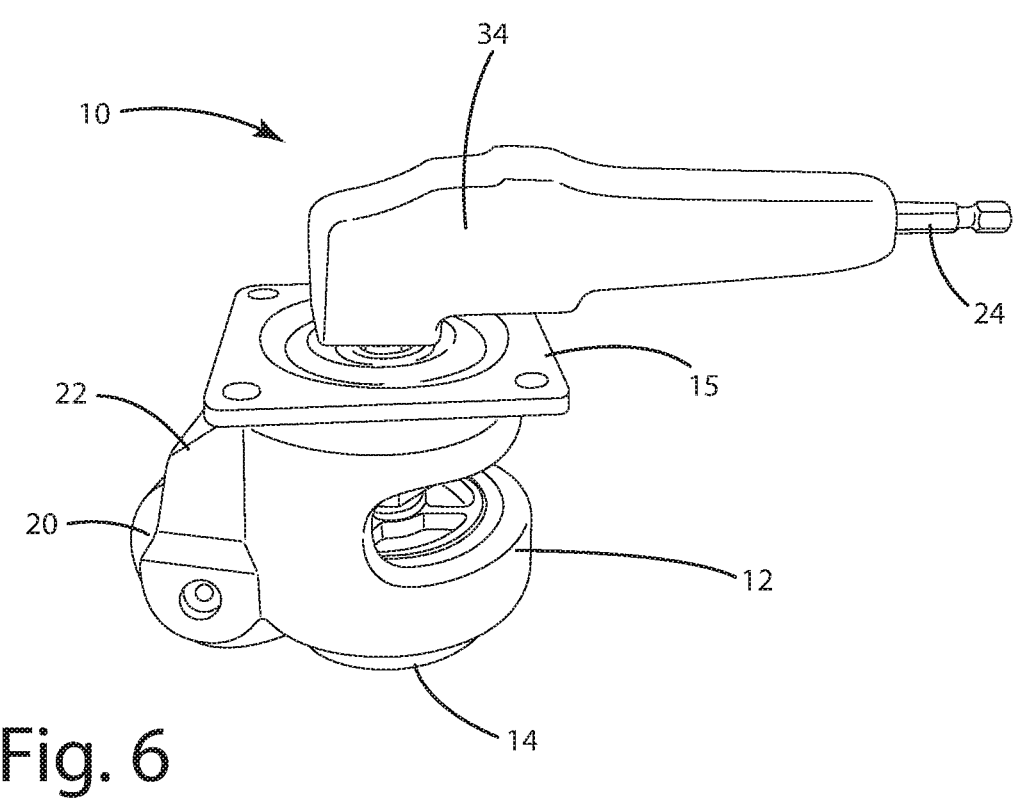
FIG. 6 illustrates a side view of a caster assembly having a 90 degree activation shaft.

In an embodiment illustrated in FIGS. 6-8, the actuation shaft 24 may extend away from the body vertically 12 at approximately a 90 degree angle with respect to the adjustment shaft 26. The actuation shaft 24 may connect to the adjustment shaft 26 by an appropriate gearing 34. The gearing 34 may include a bevel gear connection, as described above, or any other appropriate type of gearing.

The 90 degree and angled connections shown in FIGS. 1-2 and 6-8 may provide for actuation of the caster assembly 10 while a load is placed on the top pads 15. This may allow the caster assembly 10 to be altered between a movable condition (retracted position) and a stable condition (extended position) while supporting a load. It further may allow for leveling of a load once it has been positioned and stabilized.

It will be appreciated that the length of the actuation shaft 24 may be any appropriate length to account for access, depending on the supported load. For example, a supported machine having a large footprint may have a longer shaft 24 to allow for accessibility outside of the machine's footprint.

In an embodiment, the caster assembly 10 may include motorized control of the adjustment shaft 26. For example, the caster assembly 10 may include a motor or other powered actuator connected to the adjustment shaft 26. The motor may be configured to rotate the adjustment shaft 26 to drive movement of the foot 14 and adjust the height of the caster assembly 10.

In an embodiment, the caster assembly 10 may further include a controller, such as a microcontroller, in communication with the motor or powered actuator. The controller may allow for the adjustment shaft 26 to be selectively driven and adjusted based on various received inputs. For example, the controller may be programmed to receive sensor data from a supported load, such as leveling sensor information from a supported machine. The controller may monitor the leveling sensor data and may adjust the height of each caster assembly 10 supporting the load until the load is leveled. The controller may further be configured to receive remote data, such as Bluetooth or Wi-Fi signals. The adjustment shaft 26 may then be selectively driven based on input data received from a remote devices, such as a cell phone or tablet device.

In an embodiment illustrated in FIGS. 9-13, the caster assembly 10 may include a gearbox 40 positioned on top of the top pad 15. The gear box 40 may be configured to be situated between the top pad 15 and the supported load. It will be appreciated that the gearbox 40 may be any appropriate shape and size and may be any housing configured to house the components described below.

The gear box 40 may house a gear 42 connected to the adjustment shaft 26. The gear 42 may attach near the top of the shaft 26 and drive the shaft 26 when rotated to extend and contract the foot 14.

The actuation shaft 24 may be selectively engagable, such as in a clutch arrangement, with the gear 42. For example, as illustrated in FIGS. 9-13, the actuation shaft 24 may be biased away from the gear 42 to prevent any engagement between the actuation shaft 24 and the gear 42, unless a force greater than the biasing force is applied to the actuation shaft 24 against the biasing force. For example, a biasing mechanism, such as a spring 44, may be connected to the actuation shaft 24 through a side of the gearbox 40. The spring 44 may be seated in a housing 46 positioned at least partially inside the gearbox 40. The actuation shaft 24 may extend through the housing 46 to engage the gear 42. The spring 44 may be seated in the housing 46 to bias the actuation shaft 24 away from the gear.

The actuation shaft 24 may further include a key 48 at or near an interior end of the shaft. The key 48 may be sized and shaped to engage the gear 42 to facilitate rotation of the gear 42 when the actuation shaft 24 is rotated.

Figure 13:
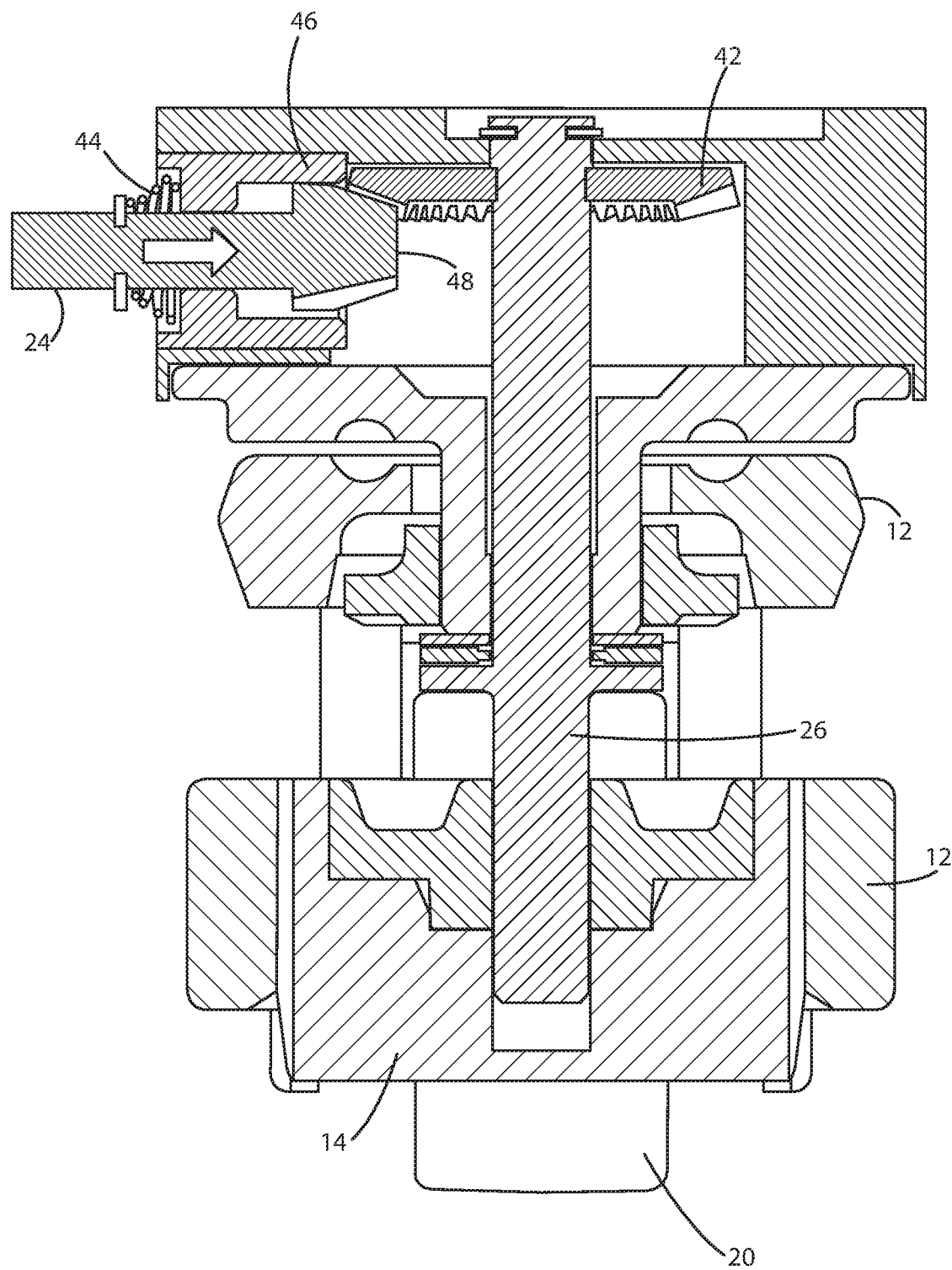
FIG. 13 illustrates a cutaway view of a caster assembly having a biased actuation shaft in the engaged position

The actuation shaft 24 may be movable between a disengaged position (shown in FIG. 12) and an engaged position (shown in FIG. 13). For example, the actuation shaft 24 may be slidable within an opening in the housing along a first axis. That first axis may be generally perpendicular to an axis of rotation of the gear 42, as shown in FIGS. 9-13. Alternatively, the actuation shaft 24 may be configured to travel along an axis at any angle with respect to the axis of rotation of the gear 42.

The actuation shaft 24 may be biased to disengaged position by the spring to prevent rotation of the gear 42 when the actuation shaft 24 is not engaged. To engage the actuation shaft 24, a force may be applied along its axis of travel to engage the key 48 with the gear 42. The actuation shaft 24 may then be rotated by any appropriate means, such as by applying a drill or other motorized device to rotate the shaft 24 or by manually rotating the shaft 24 through other mechanical means.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. An adjustable caster assembly comprising:
   a body having a top surface and a base, and including an opening at the base;
   a wheel connected to the body wherein the wheel is configured to extend beyond the base of the body and engage a supporting surface;
   a foot positioned within the opening in the base, wherein the foot is configured to move between an expanded position and a contracted position;
   an adjustment shaft connected to the foot, wherein the adjustment shaft is configured to drive the foot between an expanded and contracted position;
   an actuation shaft configured to drive the adjustment shaft wherein the actuation shaft is configured to move between a disengaged position and an engaged position and is biased towards disengaged position.

2. The adjustable caster assembly of claim 1, wherein the foot is configured to move telescopically with respect to the base.

3. The adjustable caster assembly of claim 1, wherein the actuation shaft is arranged generally perpendicular to the adjustment shaft.

4. The adjustable caster assembly of claim 1, further comprising a gear connected to the adjustment shaft, wherein the actuation shaft is configured to drive the gear.

5. The adjustable caster assembly of claim 4, wherein the actuation shaft includes a key configured to engage the gear.

6. The adjustable caster assembly of claim 1, wherein the actuation shaft is engaged to drive the adjustment shaft when in engaged position and wherein the actuation shaft is disengaged and not capable of driving the adjustment shaft when in disengaged position.

7. The adjustable caster assembly of claim 1, wherein the actuation shaft is biased by a spring.

8. The adjustable caster assembly of claim 7, wherein the spring is held within an housing.

9. The adjustable caster assembly of claim 1, wherein the foot is configured to extend beyond the wheel when in expanded position.

10. The adjustable caster assembly of claim 1, wherein the body comprises a generally hollow cylindrical body.

11. An adjustable caster assembly comprising:
    a body having a top surface and a base, and including an opening at the base;
    a wheel connected to the body wherein the wheel is configured to extend beyond the base of the body and engage a supporting surface;
    a foot positioned within the opening in the base, wherein the foot is configured to move between an expanded position and a contracted position;
    an adjustment shaft connected to the foot, wherein the adjustment shaft is configured to drive the foot between an expanded and contracted position;
    a gear connected to the adjustment shaft, wherein an actuation shaft is configured to drive the gear, and a gear box positioned above the top of the body and housing the gear therein, wherein the gearbox is configured to support a load thereon.

12. The adjustable caster assembly of claim 11, wherein the foot is configured to move telescopically with respect to the base.

13. The adjustable caster assembly of claim 11 wherein the actuation shaft is configured to move between a disengaged position, wherein the actuation shaft is disengaged with the gear, and an engaged position, wherein the actuation shaft is engaged with the gear.

14. The adjustable caster assembly of claim 13, wherein the actuation shaft is arranged generally perpendicular to the adjustment shaft.

15. The adjustable caster assembly of claim 13, wherein the actuation shaft includes a key configured to engage the gear.

16. The adjustable caster assembly of claim 13, wherein the actuation shaft is biased towards disengaged position.

17. The adjustable caster assembly of claim 16, wherein the actuation shaft is biased by a spring.

18. The adjustable caster assembly of claim 17, wherein the spring is held within an housing.

19. The adjustable caster assembly of claim 11, wherein the foot is configured to extend beyond the wheel when in expanded position.

20. The adjustable caster assembly of claim 11, wherein the body comprises a generally hollow cylindrical body.

* * * * *